Nov. 15, 1960 C. E. ANDERSON 2,960,563

MAGNETIC TAPE SYSTEM AND METHOD FOR RECORDING AND REPRODUCING COLOR TELEVISION SIGNALS

Filed Dec. 13, 1955 4 Sheets-Sheet 1

INVENTOR.
CHARLES E. ANDERSON
BY
Flehr & Swain
ATTORNEYS

INVENTOR.
CHARLES E. ANDERSON
BY
Fleher and Swain
ATTORNEYS

INVENTOR.
CHARLES E. ANDERSON
BY
Flehr and Swain
ATTORNEYS

INVENTOR.
CHARLES E. ANDERSON
BY
Fleher and Swain
ATTORNEYS.

United States Patent Office 2,960,563

Patented Nov. 15, 1960

2,960,563

MAGNETIC TAPE SYSTEM AND METHOD FOR RECORDING AND REPRODUCING COLOR TELEVISION SIGNALS

Charles E. Anderson, San Carlos, Calif., assignor to Ampex Corporation, Redwood City, Calif., a corporation of California Filed Dec. 13, 1955, Ser. No. 552,854

11 Claims. (Cl. 178—5.4)

This invention relates generally to a magnetic tape system and method, and more particularly to a magnetic tape system and method capable of recording and/or reproducing a plurality of signals each extending over a wide frequency band on a single record track, including, for example, color television signals.

In co-pending application Serial No. 524,004, filed July 25, 1955, for "Broad Band Magnetic Tape System and Method," there is disclosed a system making use of a rotary head assembly for recording and/or reproducing signals over a wide frequency spectrum. The head assembly used in that system employs a plurality of transducer units which are mounted to rotate and sweep transversely across a magnetic tape. Speed control means is employed in conjunction with means for driving the head assembly and the means for driving the magnetic tape, during recording and to ensure accurate tracking and synchronization. The tape employed is relatively wide as compared with tape used in conventional magnetic tape practice. The side margins of the tape may be employed for sound recording and for recording a control frequency used with the speed control means. The system disclosed in the copending application employs FM recording, although the rotary head assembly and the associated mechanical parts may be used for AM carrier recording.

As is well known, the NTSC (National Television System Committee) color television system is now accepted as the standard. It is a compatible system, that is the program may be received by both monochrome and color receivers. The bandwidth of the color signal is the same as that for a monochrome signal.

Three television cameras, each responsive to a different primary color (red, green and blue) scan the scene and each produces a signal indicative of the particular color. The simplest way to transmit these signals would be to feed each to a different transmitter. Three receivers would receive the signal and display it on three cathode ray tubes. The three images would be projected onto one screen. The same scheme could be used for tape recording of the color television signals, that is, three records could be made. To transmit or record the signal in this manner is wasteful of equipment and spectrum space.

In color television broadcasting, a high resolution black and white picture is transmitted on a conventional television channel and the color information is multiplexed therewith.

Three signals are transmitted and are referred to as Y, Q and I signals. The Y signal is the high definition black and white signal that may be received on conventional receivers. The other signals, the Q and I signals, when properly added to or subtracted from the Y signal, yield the three primary color signals, red, blue and green. The Q and I signals are restricted in bandwidth as follows: The Q is limited to approximately 500 kc. and the I signal to approximately 1.2 megacycles. The I and Q signals are applied to balanced modulators which suppress the sub-carrier components leaving the sidebands positioned in the video spectrum the same as though the sub-carriers were still present. The sub-carrier voltages are generated by a sub-carrier oscillator. The voltage applied to the I modulator is "in phase," while the voltage applied to the Q modulator is "in quadrature."

Although the black and white (Y) picture signal information occupies a bandwidth of approximately 4.2 mc., the frequency distribution of energy within the band is not continuous. It is concentrated in small frequency groups, evenly spaced within the video band. These frequency groups are centered around harmonics of the horizontal scanning rate. Between these harmonic frequency groups are empty spaces or holes where no black and white information exists. The empty frequency spaces (holes) in the Y signal are available for signals representing color information. The color signal I and Q sidebands are also spaced by frequency intervals which are centered at harmonics of the horizontal scanning rate. The sub-carrier is chosen so that the color sideband clusters fall within the holes. Thus the clusters of the Y and the I and Q frequencies are interlaced with the Y signal.

Although the standard multiplexing method described above is suitable for transmission of color video signals, the frequency spectrum cannot be recorded and/or reproduced on equipment of the type described in said copending application. This is due to the inherent difficulty in controlling frequencies in reproduction whereby the "in phase" and "quadrature" sub-carriers maintain the necessary phase relationship.

Aside from color television, it is often desirable in other applications such as radar to record two or more signals which have a broad frequency spectrum which is not continuous over the band which it occupies. In the past it has been necessary to record each of these signals on separate record tracks.

In general it is an object of the present invention to provide a novel system and method for the recordation and/or reproduction of two or more signals on a single record track.

It is still a further object of the present invention to provide a system and method for the recordation and/or reproduction of a plurality of signals characterized in that the signals are interlace multiplexed to form a composite signal for recordation on a single magnetic track.

It is still another object of the present invention to provide a magnetic tape method and system for the recordation and/or reproduction of a plurality of signals, at least one of which has a broad frequency spectrum, on a single magnetic track.

It is still a further object of the present invention to provide a system and method of the above character for the recordation and/or reproduction of a plurality of signals on a single magnetic track which is characterized by the fact that the signals are carried by carriers and by sub-carriers which are referenced to the carriers.

Additional objects and features of the invention will appear from the following description when read in conjunction with the accompanying drawing.

Referring to the drawing.

Figure 1A:
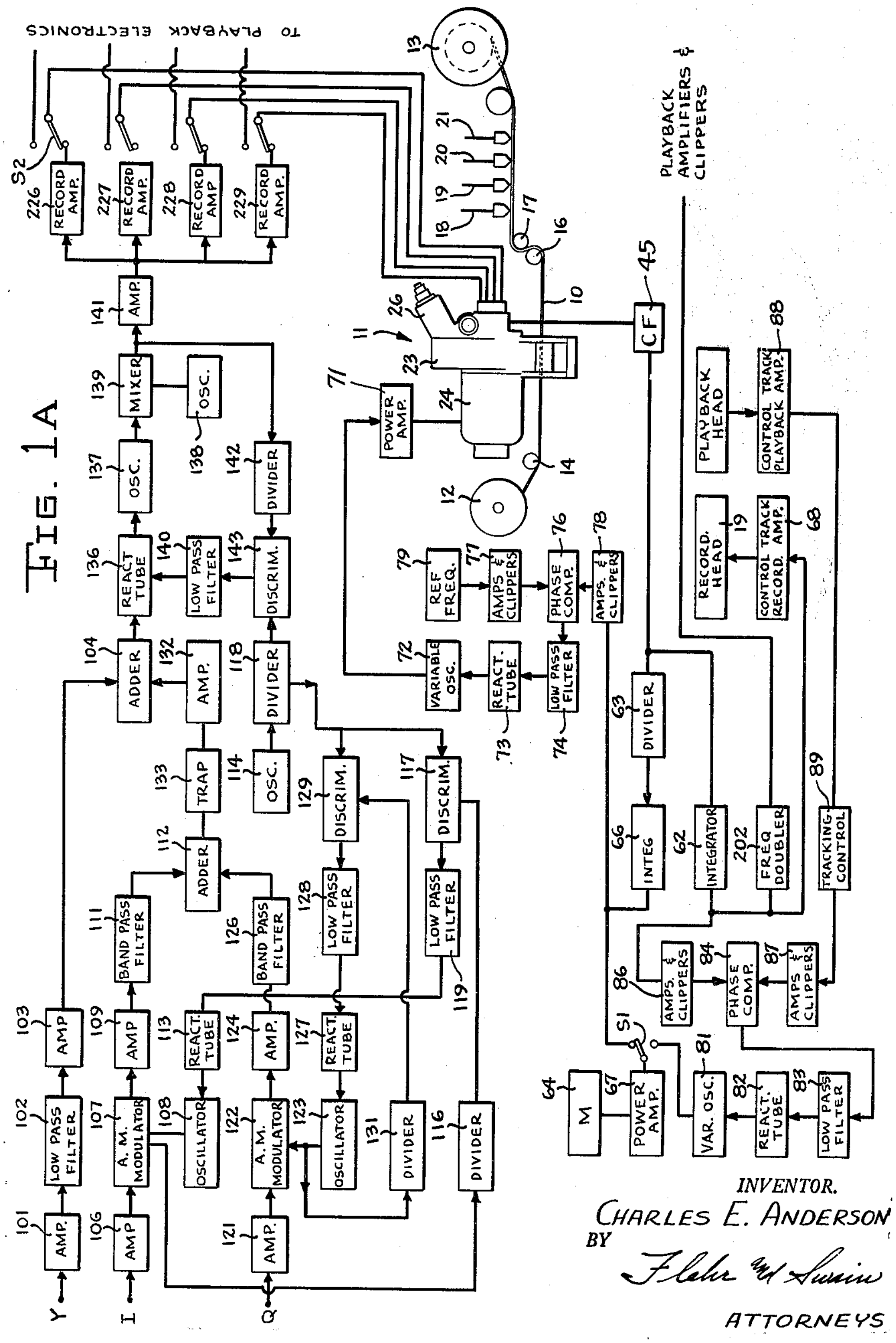
Figures 1A and 1B show a circuit diagram illustrating a complete recording and reproducing system incorporating the present invention.
Figures 2, 3:
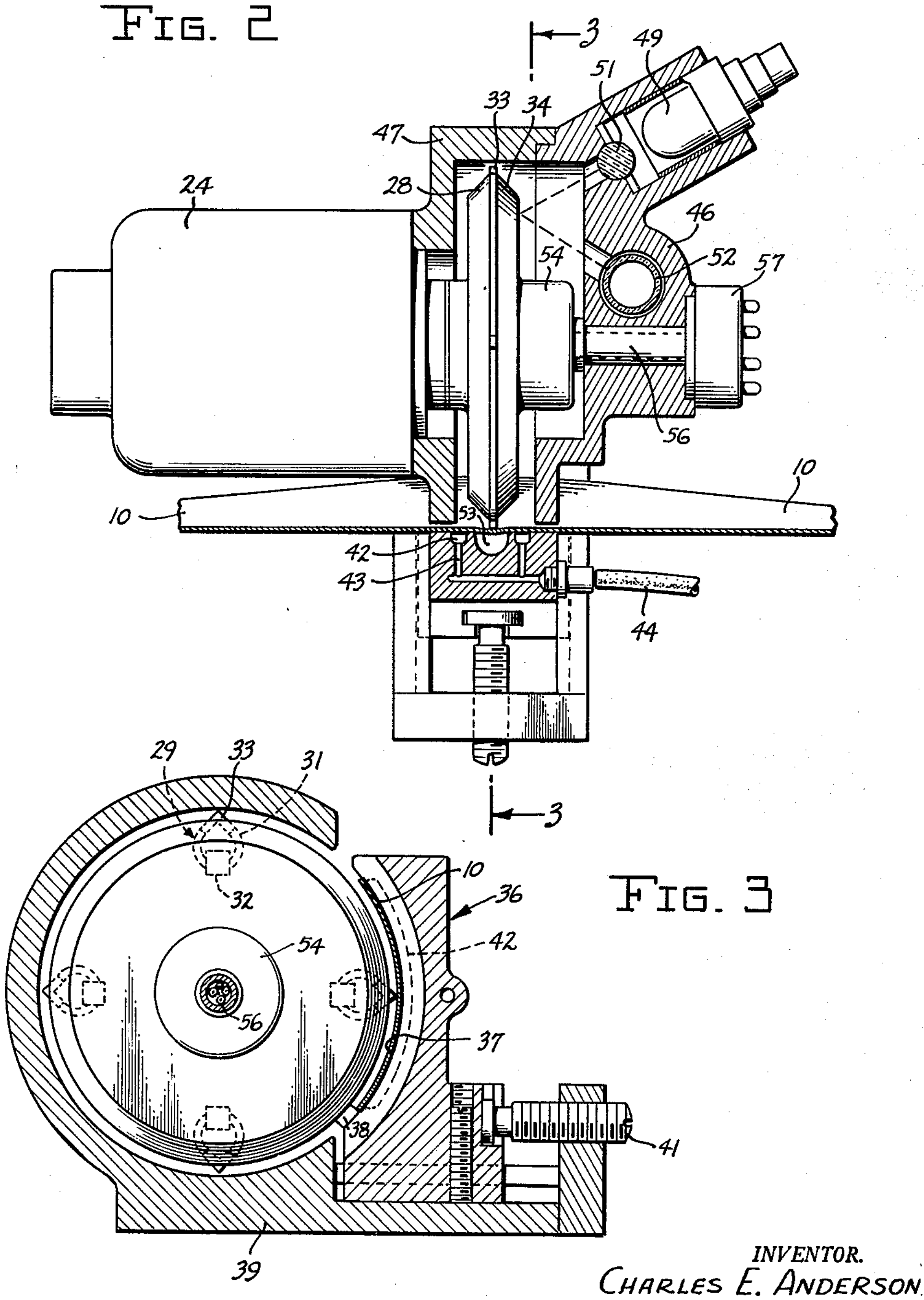
Figure 2 is a plan view partly in section illustrating the rotary head assembly and associated parts.
Figure 3 is a cross sectional view taken along the line 3—3 of Figure 2.

The present method and system may employ apparatus 11 (Figure 1A) of the type having a plurality of recording or playback (i.e. transducers) units which are caused to sweep successively across a magnetic tape as the tape is moved longitudinally. Preferably the sweep paths of the units are rectilinear, and the tape is cupped or curved to conform to the surface of a cylinder in the region where it is contacted by the units. Suitable apparatus of this type is illustrated in Figures 2 and 3. The transport means illustrated for carrying and feeding the tape 10 past the units includes conventional supply and takeup reels 12 and 13 which may be carried by suitable turntables. Guide studs or rollers 14 and 16, which are preferably flanged, are disposed to engage the tape at spaced intervals from the operating heads of the head assembly. The tape also engages the driving capstan 17, and for purposes to be presently explained, it is shown in contact with the magnetic heads 18, 19, 20, 21, which operate upon the margins of the tape. The tape employed is of substantial width compared with the tape used with conventional magnetic equipment. For example, it may have a width of the order of two inches. Like magnetic tape now available on the market for sound recording it consists of a pliable film of plastic material having a thin coating of magnetic material on one side of the same which is magnetized by the signal to provide a magnetic record.

The head assembly 23 is driven by a suitable electric motor 24. Pulse generating means 26 is associated with the head assembly and serves to generate pulses having a frequency dependent upon the speed of rotation of the head assembly 23. The pulses thus generated are used in conjunction with the speed control system.

A suitable head assembly having pulse generating means is illustrated in Figures 2 and 3. A wheel 28 is directly mounted on the shaft of the motor 24. This wheel carries a plurality of transducer units 29. Each of these units consists of a magnetic core 31 together with suitable core windings 32. The tips 33 of the units are made of relatively hard material and project a short distance beyond the wheel 28. Preferably, the wheel is beveled as indicated at 34, whereby the peripheral surface has a width which corresponds generally to the width of the tips of the transducer units 29. The thin magnetic gap between the tips of each unit may be in a plane which is coincident with the axis of rotation and perpendicular to the plane of the wheel. A tape retaining or holding means designated generally by the reference numeral 36 is placed adjacent to one side of the wheel 28. The retaining or holding means 36 serves to present the tape in the desired cupped condition for contact with the rotating tips of the transducer units. Referring particularly to Figure 3, the holder 36 has a tape engaging surface 37 formed as an arc of a circle and having the axis of the motor shaft as its center. One or more stops or shoulders 38 are provided for engaging one edge of the tape. The holder can be mounted on a guideway 39, provided with means such as adjusting screw 41, whereby it may be set in the proper relative position to the motor shaft.

Preferably, pneumatic means is employed to insure contact of the tape with the arcuate surface 37. Thus the grooves 42 are provided which terminate short of the upper and lower edges of the arcuate surface 37, and which are connected to ducts 43 which communicate with the tube 44. The tube provides means for connecting to a suitable vacuum system. In general, it is preferable that the vacuum be adjustable, and this may be accomplished by means of suitable valves placed in the connecting line 44.

Figure 4:
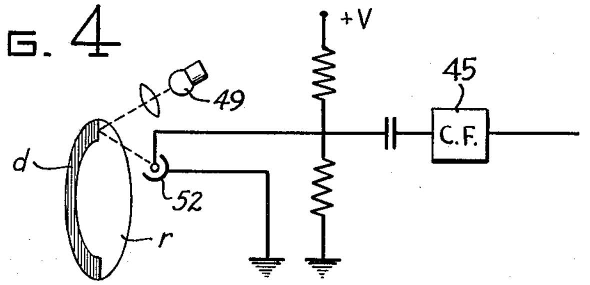
Figure 4 is a circuit diagram schematically illustrating the pulse generator.

The pulse generating means can be a separate mechanism having a mechanical connection to the wheel 28. However, I prefer to employ simple means of the type illustrated in Figure 2. The mounting 46 in conjunction with the part 47 forms a housing for the wheel 28. A source of light, such as an electric lamp 49, is focused by the lens 51 upon one side of the wheel 28. The light reflected from the wheel is received by the photoelectric tube 52. Referring particularly to Figure 4, one segment of the wheel is shown darkened *d* and another segment made light reflecting *r*. Thus recurrent pulses of light will strike the photoelectric tube 52 whereby a pulsating output having a frequency which corresponds to the speed of rotation of the wheel 28 is generated. The photoelectric tube is coupled to a cathode follower 45, the output of which is applied to the motor control system and is also employed to perform certain switching operations during playback.

Figure 2 illustrates the manner in which the magnetic tape is cupped as it moves past the wheel 28 and in contact with the curved surface 37 of the holding means 36. The holder is recessed or cut away as indicated at 53 for the entire length of the arcuate surface 37. The portions of the tape scanning this recess are contacted by the tips 33 of the transducer units. Normally the contact is of sufficient pressure to slightly stretch and indent the tape in the small localized region being contacted by the transducer tip. The gap 53 allows the tape to be deflected. This system serves to provide a relatively stable and continuous contact pressure between the tape and the transducer units as they sweep across the tape.

Means are provided to make external connections to the several transducer units 29. For example, a suitable slip ring means may be provided within the wheel hub 54. The leads from the slip rings are then taken out through the opening 56 to the terminal block 57. One side of the transducer unit can be grounded and the other side connected to the slip ring means which in turn connects with the individual leads for the external connection.

The apparatus described above requires proper speed control for both the recording and reproducing operations. The complete system illustrated in Figure 1A incorporates means for controlling both the capstan drive and the head assembly drive. As illustrated in Figure 1A the cathode follower 45 is connected to the wave shaping filter or integrator 62 and to the divider 63. The divider serves to reduce the frequency of the pulses to a frequency which is convenient for operating the synchronous or alternating current motor 64, designated by the block M which is employed for driving the capstan. The output of the divider 63 is applied to the wave shaping filter or integrator 66, thence to the power amplifier 67 which serves to amplify the signal sufficiently for driving the motor 64. The wave shaping filters or integrators 62 and 66 may be simple LC circuits tuned to the frequency being passed and serving to shape the wave to more nearly a sine wave form.

The signal from the pulse generating means is also recorded on the margin of the tape as a recorded control frequency. Thus the filter or integrator 62 connects with the amplifier 68 which in turn has its output applied to the record head 18. This record head operates on one margin of the tape and serves to record a control frequency on the tape as it is moved longitudinally past the head.

The motor 24 which drives the head assembly has its power supplied by the power amplifier 71. The power amplifier has its input connected to the variable oscillator 72 which includes suitable means for controlling its frequency of operation. For example, the means may comprise a reactance tube 73 which serves to control the frequency of the oscillator 72 as the applied voltage is varied. The controlling voltage is applied to the reactance tube 73 through the low pass filter 74 which is connected to the phase comparator 76.

The amplifiers and clippers 77 and 78 are both connected to the phase comparator 76. A suitable source of reference frequency 79 is connected to the amplifiers and clippers 77. The source of frequency may be any suitable source such as the ordinary 60 cycle current supply. The amplifiers and clippers 78 are connected to the wave shaping filter or integrator 66 which is connected to the divider 63. Assuming that the divider 63 is properly chosen, the integrator 66 will supply current at a frequency of 60 cycles to the amplifiers and clippers 78. If the source 79 is normally at the same frequency then the control voltage supplied by the phase comparator 76 is of a value which is dependent upon the amount of phase difference between the two applied alternating currents. The amplifiers and clippers ensure application of current at the same amplitude from both the reference frequency and from the pulse generating means to the phase comparator.

Thus, during recording operation, the frequency supplied by the pulse generating means is recorded as a control frequency along one margin of the tape, and sub-multiples of this frequency, as for example 60 cycles per second, is applied to the phase comparator 76. A like frequency is supplied from the reference source 79. The phase difference between these two signals causes a change in the control voltage applied by the phase comparator to the reactance tube 73. This causes compensating changes in the frequency supplied to the power amplifier 71 by a variable oscillator 72. Consequently the frequency supplied to the motor 24 varies, whereby the speed of the motor varies in conjunction with the phase difference detected by the phase comparator 76. This arrangement serves to compensate for certain mechanical deficiencies of the apparatus.

For reproducing operations, the switch S1 is shifted to connect the input of the amplifier 67 to the output of the variable oscillator 81. The variable oscillator 81 includes means whereby its frequency of operation is changed in response to a controlling voltage. This, for example, may comprise a reactance tube 82 which varies the frequency of the oscillator 81 in response to a controlling voltage. The controlling voltage is applied to the reactance 82 through a low pass filter 83 which is connected to the output of the phase comparator 84. The amplifiers and clippers 86 and 87 serve to supply currents having the same amplitude to the phase comparator. The amplifiers and clippers 86 are connected to the wave shaping filter or integrator 62 which in turn receives a frequency which corresponds to that of the pulse generator. The amplifiers and clippers 87 are connected to the control track playback amplifier which receives its signal from the transducing head 19. This head serves to reproduce the control pulses which were recorded during the recording operation. The phase comparator 84 supplies an output voltage which is dependent upon the phase difference of the currents supplied by the amplifiers and clippers 86 and 87. As previously described, one of the amplifiers and clippers is connected to receive the generated pulses which have a frequency dependent on the speed of the wheel 23 while the other is connected to receive the pulses which were recorded during the recording operation. The phase comparator gives an output voltage which depends upon the frequency difference of these pulses. Thus, during reproduction operations, the capstan motor M is under close control by virtue of the frequency supplied by the variable oscillator 81. The motor M drives the tape past the rotary head assembly at a speed which is precisely the same as the speed which occurred during the recording operations. The servo system described for controlling the motor repeats variations which occur during recording during reproduction.

The tracking control 89 which is interposed between the amplifiers and clippers 87 and the playback amplifier 88 has a phase adjusting device. By adjusting the tracking control during operation the transducer units are brought into proper tracking relation with the recorded tracks on the magnetic tape which passes under the recording heads.

For purposes of illustration, it may be assumed that it is desired to record three signals on a single record track. For example, the signals may represent the Y, I and Q signals encountered in color television transmission and which extend over the approximate frequency band 0–4.2, 0–1.2 and 0–0.5 mc. respectively. As is well known, these signals are derived by employing three camera tubes each responsive to a different color (green, blue and red). The signals from the three camera tubes are passed through a correction amplifier which serves to correct the signals for the receiver tube and are then combined in a predetermined manner in a matrix to form the Y, I and Q signals.

In broadcasting, the Y, I and Q signals are applied to a multiplexer which forms the composite color video signal. As previously described, the composite signal cannot be recorded on apparatus of the type disclosed in the aforementioned copending application. Although the ensuing discussion is directed to the recordation on a single track of a color television signal, it is to be understood that the principles disclosed are applicable to recording two or more signals which are not continuous over their frequency spectrum without reference to color television.

Figure 1B:
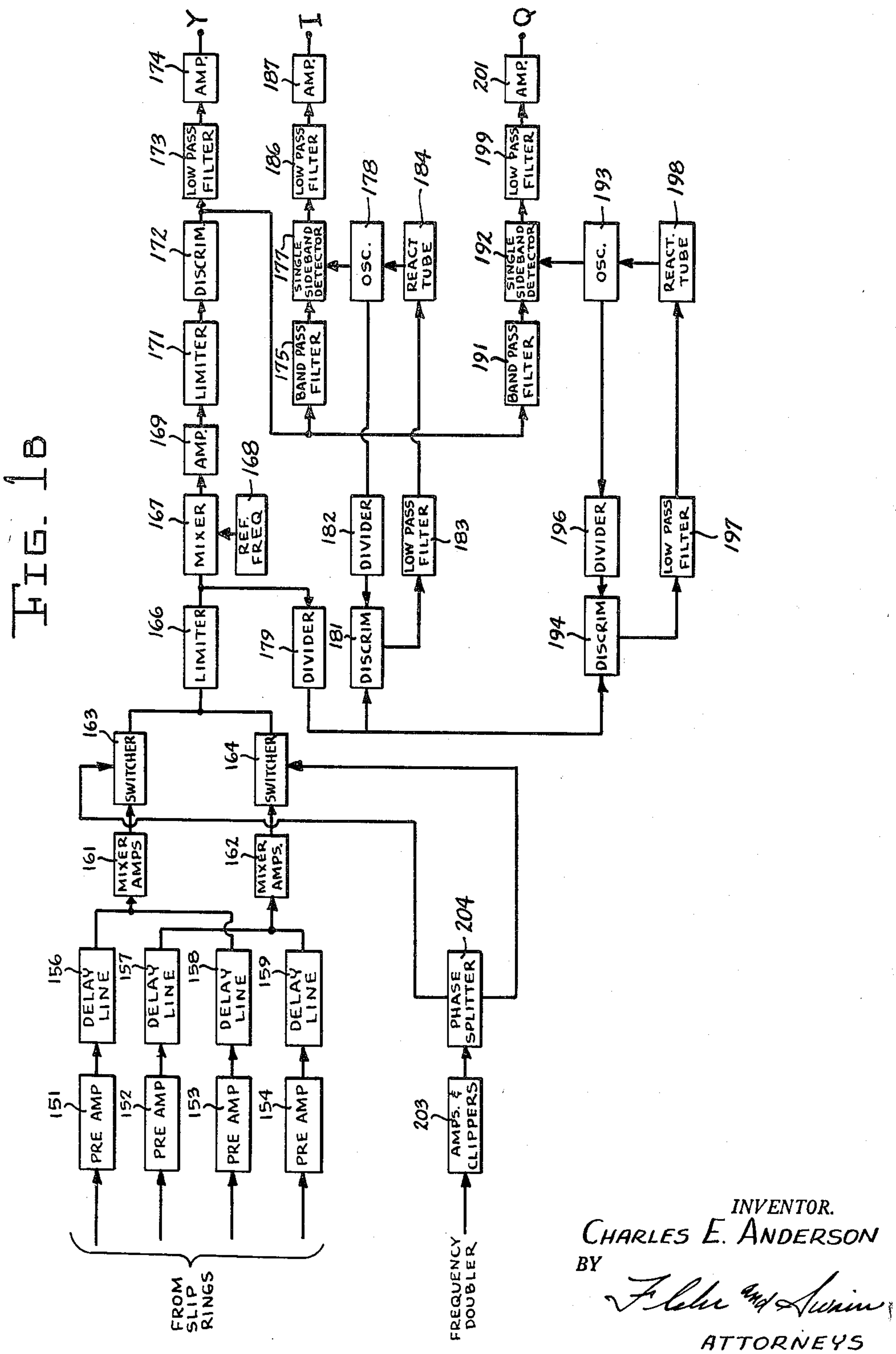

In Figure 1, the electronics connected to the units of the head assembly and used in the recording are indicated in Figure 1A and the electronics for playback are indicated in Figure 1B. One signal, for example, the Y signal derived from the matrix or from a receiver is fed to an amplifier 101 and thence to a low pass filter 102 to remove all of the frequency components above a certain frequency. For example, when the recording apparatus is employed for recording the color television signal, the low pass filter may remove all the frequency components above 2.5 mc. The percentage of picture information remaining is sufficient to reproduce an excellent picture or reproduction since the frequencies contained in this band carry most of the picture information. The frequency limited signal is then amplified 103 and applied to the adder 104.

The one or more remaining signals which are to be recorded on a signal track are treated alike, except for the frequencies chosen for their sub-carriers. As previously described, in color television the spectrum of the signal is not continuous over the frequency range. It is made up of small clusters of energy which occur at $n$ times the scanning frequency (where $n$ is an integer) up to the highest frequency to be reproduced. By choosing a sub-carrier whose frequency is $(n+\frac{1}{2})f_h$, where $f_h$ is the scanning frequency, the spaces between bursts of energy of $nf_h$ frequency are filled with sidebands from the sub-carriers modulated by the remaining signals which also have bursts of energy which occur at the scanning frequency. By properly choosing the location of the sub-carriers, the signals may be interlaced with the original signal and with each other to occupy the same frequency band.

Similarly, radar signals are of the type which are not continuous over their frequency spectrum. Here also a plurality of signals may be interlaced to occupy a single frequency band.

In apparatus for recording color television signals, the Y signal is limited as previously described. The I signal is placed on a sub-carrier which has a frequency $(n+\frac{1}{2})f_h$ and which is just above the highest Y frequency which is to be recorded (2.5 mc.). The upper sidebands of the modulated sub-carriers are suppressed. The Q signal is placed upon a second sub-carrier which has a frequency above the I sub-carrier. No effort need be made to interlace its sidebands with the I and Y signals. The amplitude modulators which serve to modulate the I and Q sub-carriers are of the suppressed carrier type since the two sub-carriers might produce objectionable beat notes.

Referring again to Figure 1A, the second signal, the I signal, for purposes of example, is applied to the amplifier 106 and then is applied to a modulator 107 which modulates the frequency supplied by the oscillator 108. The modulator may be of the balanced type and suppresses the sub-carrier frequency leaving only the sidebands positioned in the video spectrum as though the sub-carriers were still present. The sidebands are amplified by the amplifier 109 and applied to the band pass filter 111 which passes the lower side band. The output of the filter is applied to the adder 112.

The oscillator 108 is of the type which may have its frequency controlled by a control voltage. For example, the oscillator may have a reactance tube 113 which serves to control the frequency of oscillation in response to a controlling voltage. The frequency of operation of the oscillator 108 is controlled by comparing its frequency with that of a crystal controlled oscillator 114. When the frequency varies, the reactance tube serves to correct the frequency. A sample of the oscillator frequency 108 is applied to the divider 116 and thence to the phase discriminator 117. A sample of the frequency from the crystal oscillator 114 is applied to the divider 118 and then to the discriminator 117. The two frequencies are compared by the discriminator 117 and a voltage proportional to the difference of the two frequencies is applied to the reactance tube 113 through the low pass filter 119. The reactance tube 113 serves to control the frequency of operation of the oscillator 108 as previously described.

The third signal, which may be the Q signal in color telvision, is amplied by the amplifiers 121 and applied to the AM modulator 122. The modulator 122 serves to modulate the frequency supplied by the oscillator 123. The modulator may, for example, comprise a balanced modulator which serves to suppress the sub-carrier components of the modulated signals leaving only the sidebands positioned in the video spectrum as if the sub-carriers were still present. The sidebands are amplified by the amplifier 124 and applied to the band pass filter 126 which serves to remove the undesirable components and are then applied to the adder 112.

The oscillator 123 is of the type which has its frequency controlled by a control voltage. For example, the oscillator may include a reactance tube 127 which serves to control the frequency of operation. The voltage applied to the reactance tube through the low pass filter 128 is derived by comparing the frequency of the oscillator 123 with the frequency from the crystal oscillator 114. The frequency of the crystal controlled oscillator is divided down to a convenient frequency by the divider 118, and applied to the discriminator 129. The frequency from the oscillator 123 is also divided down by the divider 131 and applied to the discriminator 129 which serves to compare the two frequencies and apply a controlling voltage to the reactance tube which is proportional to the difference between the two frequencies. This voltage serves to correct the sub-carrier oscillator frequency to maintain it at the proper relationship with respect to the oscillator 114.

The sidebands of the second and third signals, I and Q, for example, are combined by the adder 112, amplified by the amplifier 132, and applied to the adder 104. The trap 133 serves to eliminate unwanted frequencies. The adder 104 serves to combine the three signals to form a composite signal which is applied to the reactance tube 136. The reactance tube 136 controls the frequency of oscillation of the high frequency oscillator 137. The output of the oscillator 137 is mixed with the output of a crystal controlled oscillator 138. The mixer 139 serves to mix or beat the two frequencies to produce a frequency modulated carrier whose average or rest frequency is closely controlled.

The carrier frequency is drawn off before the amplifier 141 and divided by the divider 142, where it is compared with the signal from the crystal oscillator 114 which has been divided by the divider 118. The discriminator 143 serves to compare the two signals and give an output voltage which is proportional to the frequency difference of the two signals. The output of the discriminator 143 is filtered through a low pass filter 140 to remove modulation effects and then is applied to the reactance tube 136 which modulates the oscillator 137. In this manner the frequency of the oscillator 137 is closely controlled and tied to the frequency of the oscillator 114.

Thus it is seen that the carrier and sub-carrier frequencies are all referenced to the crystal oscillator 114. As will be presently described in conjunction with the reproducing operation. this is important since the suppressed carrier modulation is employed for the second and third, I and Q, signals. In order to re-inject the sub-carriers in reproduction, it is desirable that there be some relationship between the main carrier frequency and the sub-carrier frequencies. By referencing the sub-carriers and carrier to a common crystal controlled frequency, any changes in head speed will be compensated for automatically. If the head is fast during playback, the main carrier frequency and sub-carrier sideband frequency will be high, but the local sub-carrier oscillators will also be raised since they are locked to the carrier frequencies. Their proper ratio to the horizontal scanning frequency will therefore be preserved.

The electronics for reproduction consists of pre-amplifiers 151–154 which have their input connected to the multiple switch S2, which serves to connect the pre-amplifiers to the heads through the slip rings. The outputs of the pre-amplifiers are applied to the delay lines 156–159. These delay lines have a broad band characteristic and have sufficient adjustment to compensate for the variations in angularity between heads.

The outputs of the delay lines 156 and 158 are combined and applied to the mixer amplifiers 161, and the outputs of the delay lines 157 and 159 are applied to the mixer amplifiers 162. The two channels represented by the mixer amplifiers 161 and 162 are applied to the switching or gating means 163 and 164. These devices are of the electronic type and are adapted to be controlled by the application of a controlling voltage to either block or pass current from the outputs of the amplifiers 161 and 162. The outputs of the switching devices are connected through the limiter 166 to the mixer 167. In the mixer 167 the frequencies from the limiter 166 and the reference frequency 168 are mixed to provide intermediate frequencies which are amplified by the intermediate frequency amplifier 169. The output of the amplifier 169 is supplied to a limiter 171, and then to the discriminator 172 for de-modulation. The output of the discriminator is passed through a low pass filter 173 which has the same pass band as the low pass filter 102 and amplified 174 to produce the output signal. For example, if the apparatus is employed for recording color television signals, this will be the Y signal.

The output of the discriminator 172 is also fed to two or more channels, corresponding to the number of original signals, where the original signal is removed. A bandpass filter 175 separates out the desired side bands which represent the original signal, for example, the I signal. The output of the bandpass filter is applied to a single side band detector 177 where the original sub-carrier frequency is inserted. This sub-carrier frequency is derived from the oscillator 178 whose frequency is controlled by the main carrier frequency. The frequency is controlled by dividing the main carrier frequency at the divider 179 and applying the divided frequency to the discriminator 181. A signal having the oscillator frequency is removed from the oscillator 178 and applied to a suitable divider 182. The output of the divider 182 is also applied to the discriminator 181. The discriminator serves to derive an output voltage which is proportional to the frequency difference between the divided carrier frequency and the divided oscillator frequency. The output voltage is passed through a low pass filter 183 and applied to a reactance tube 184 which serves to control the frequency of operation of the oscillator 178. Thus the frequency of the local oscillator 178 is directly tied to the carrier frequency.

The output of the single sideband detector is passed through a low pass filter 186. The amplifier 187 amplifies the signal for application to terminal equipment. In color transmission, this would correspond to the original I signal and would be applied to the transmitter or other associated terminal equipment.

The signal from the discriminator 172 is also applied to a band pass filter 191 which serves to separate out another group of sidebands and apply them to the single sideband detector 192. The sub-carrier is inserted at the detector 192. This sub-carrier is derived from the oscillator 193 which has its frequency controlled by the carrier frequency. The frequency is controlled by dividing the main carrier by the divider 179 and applying the frequency to the discriminator 194. A sample of the oscillator 193 frequency is divided 196 and also applied to the discriminator 194. The output of the discriminator has a voltage whose amplitude is proportional to the frequency difference between the divided carrier frequency and the local oscillator 193. The output voltage is filtered 197 and applied to the reactance tube 198 which serves to control the frequency of oscillation of the local oscillator 193.

The output of the single sideband detector is applied to a low pass filter 199 and thence to the amplifier 201. The output of the amplifier 201 is applied to the terminal equipment. In color television this signal will represent the Q signal.

Controlling pulses are applied to the switching devices 163 and 164 from the pulse generator. The output of the cathode follower, Figure 1A, is applied to the integrator or wave shaping filter 62 and to the frequency doubler 202. The output of the frequency doubler is applied to the amplifiers and clippers 203, which connect with the phase splitter 204. Thus, time voltages of opposite polarity are obtained from the phase splitter for application to the switches 163 and 164, whereby these switches alternately pass the output from the mixers and amplifiers 161 and 162, during successive intervals.

Over-all operation of the system shown in Figure 1 is as follows: Assuming by way of example that the speed of movement of each transducer unit on the rotary head assembly is in the order of 1700 inches per second relative to the tape, it is satisfactory for color television recording to employ a carrier having a center frequency of 4.5 mc. For frequencies far above 4 to 4.5 mc., there is a fall-off in effective recording. However, the fall-off is gradual and it is not an abrupt cut-off such as might cause undesirable effects. Consequently, in the present system I employ vestigial sideband FM recording, because the sideband components substantially above 4.5 mc. are not effectively recorded or reproduced.

The system shown in Figure 1 may be employed for recording the Y, I and Q component signals encountered in the terminal equipment in color television. Rather than interlace the sidebands of all three signals, the sideband components of the Y and I signals may be interlaced and the sub-carrier for the Q signal may be chosen so that the Q signal sidebands do not interlace with either of the other signals.

If the recording system makes use of narrow band frequency recording, that is, where the ratio $$\frac{\Delta F}{F_m}$$

is relatively small, where $\Delta F$ represents deviation corresponding to maximum signal amplitude, and $F_m$ represents the highest modulating frequency, frequency deviation from the center frequency can be such that the center frequency of 4.5 megacycles which is impressed on a tape may depart from its average value by 500 kc., when the amplitude of the modulating signal is at its highest value.

Figures 7, 8:
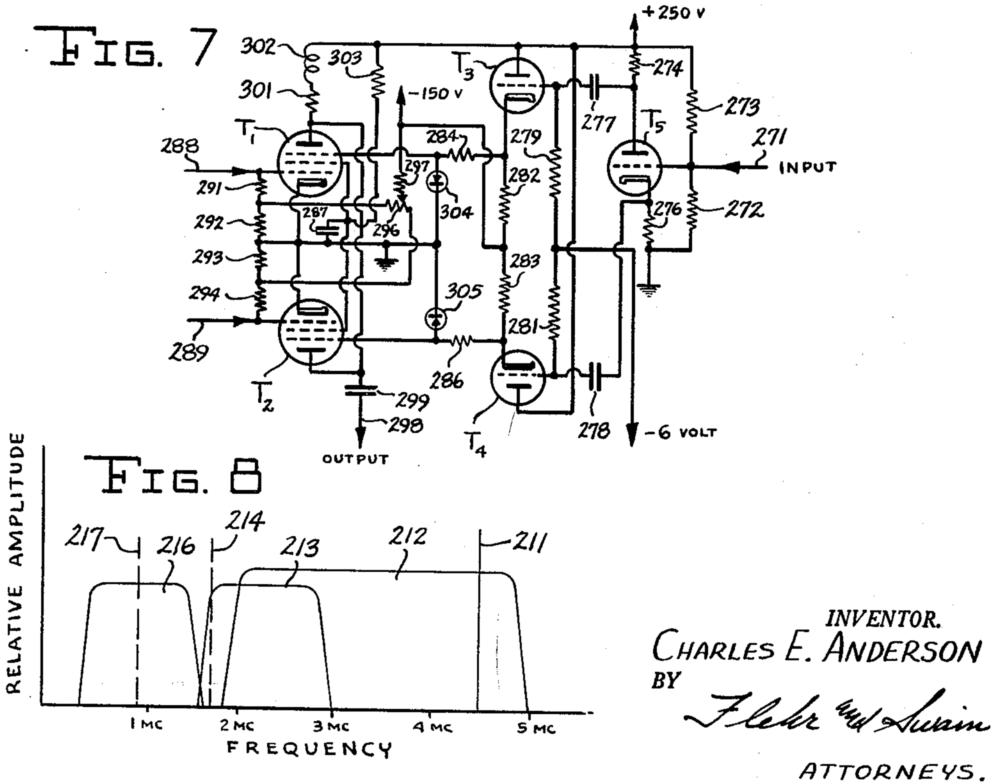
Figure 7 is a circuit diagram illustrating a suitable switching circuit.
Figure 8 shows the frequency distribution of the composite signal.

By way of example, the system described may have components as follows: The low pass filter 102 may have a pass band of from 0 to 2.5 mc. This pass band will pass modulating components which contain substantially all of the signal intelligence. The frequency of the oscillator 108 may be 2.8125 mc. and this frequency may be controlled as previously described by the crystal oscillator 114 which may have a frequency of 78.125 mc. The band pass filter 111 serves to remove the upper sideband components of the amplified output of the modulator 107. The oscillator 123 may operate at a frequency of 3.740 mc. and likewise may have its frequency controlled, as previously described by the crystal oscillator 114. The three signals are added by the adder 104 and control the reactance tube 136 which controls the oscillator 137 which may operate at a center frequency of 49.5 mc. The output of the oscillator 137 is fed to a mixer where the output is combined with the output of a crystal oscillator operating at 45 mc. to give an output frequency having a center frequency of 4.5 mc. The output of the mixer 139 will have a frequency spectrum as shown in Figure 8. The main carrier 211 will have a center frequency of 4.5 mc. The Y sidebands 212 will occupy the frequency band lying between 2–5 mc., approximately. The I sideband components 213 will occupy the frequency band 1.7–3 mc., approximately, and will interlace with the Y sideband components 212. The location of the suppressed carrier 214 is indicated by the dotted line. The Q sideband components 216 are shown in relation to their suppressed carrier 217 and will occupy the frequency band .250–1.25 mc., approximately. Thus it is seen that the signal which is recorded extends over the frequency band .250–5 mc.

In reproduction, for the example discussed with reference to recording, the reference carrier is removed at the limiter and before the signals are detected or demodulated. After the signals are detected, the output is a signal which corresponds to the signal which appears at the adder 104 in the recording operation. The low pass filter 173 will pass the frequency component between 0 and 2.5 mc. which are amplified and form the original Y signal. The output of the discriminator 172 is also fed to a band pass filter 1.6–2.85 mc. which will pass the I sideband components. The local oscillator 178 then serves to re-inject the 2.8125 mc. carrier and the signal is detected and then passed through a low pass filter 0–1.2 mc. to reconstruct the I signal. Similarly, the output of the detector is passed through a band pass filter 3.21–4.25 mc., thence to a single sideband detector wherein a local oscillator 193 reinserts the sub-carrier having a frequency of 3.740 mc. and the detected output is passed through a low pass filter 0–500 kc., amplified, and applied to the terminal equipment. Thus, the original Y, I and Q signals are reproduced from the single channel recording. As previously described, the local oscillators 178, 193 have their frequency referenced to the carrier frequency.

It will be evident to those familiar with the television systems that the Y, I and Q video signals may be obtained from the matrix connected to the camera, or may be obtained from a standard television receiver. Similarly, the reproduced video output can be used to produce a video image by utilizing an ordinary television receiver, including the synchronizing pulses and scanning auxiliaries and the amplifying means normally associated with the same. With the present system, the synchronizing pulses can be recorded together with the video frequencies for proper control of the television receiver. The reproduced video Y, I and Q signals may also be applied to the color multiplexing section of the color television transmitter.

It is of course to be understood that although the equipment has been described in detail for use in connection with recording and reproducing color television signals, it is adaptable for recording a plurality of signals whose frequency spectrum is not continuous over the band which it occupies on a single channel. By appropriately choosing the frequency of operation of the various oscillators and filters, it is possible to combine or multiplex a plurality of signals for recording on a single magnetic track and to reproduce and unscramble the signals to derive the original signals.

It is desirable in recording and/or reproducing to reference the sub-carriers to the main carrier in order that the suppressed carrier may be re-injected during the playback operations. As previously described, any changes in head speed between recording and reproduction will be compensated for automatically.

Figure 5:
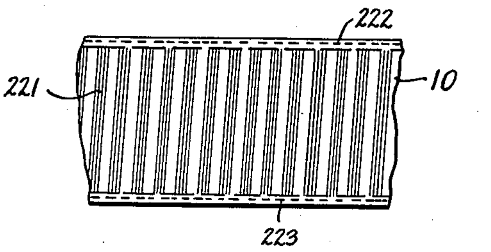
Figure 5 is a plan view illustrating record tracks on the magnetic tape.

Figure 5 illustrates a portion of magnetic tape 10 with records upon the same, assuming that the system is being used for the recording and reproduction of color television signals. The area 221 (exaggerated as to spacing) represents the rectilinear track areas which are swept by the magnetic head units. These areas are slightly spaced apart in the direction of the length of the tape, and are disposed at an angle slightly less than 90° with respect to the length thereof. By way of example, where the magnetic tape is two inches in width, each record area may have a width as measured lengthwise of the tape of 10 mils. Dotted lines 222 and 223 represent the demarcation between tracks which carry picture intelligence, and the marginal edge portions over which the erase heads 18 and 20 are operated. The head 18 is shown operating immediately in advance of the head 19 during recording. On the other margin of the tape, the head 20 can function as an erase head in advance of the head 21. Head 21 can be used for recording the sound signals. Shortly before a transducer unit reaches the line 223, the succeeding head reaches the line 222. Switching operations occur shortly before the transducer units reach the line 223. In Figure 5, it is assumed that the lower marginal head is being used for recording of audio frequencies and the upper margin for recording the control frequency. In both instances, the erase operations performed by the heads 18 and 20 eliminates most, but not all, of the track portions carrying duplicate picture information. The signal recorded by the rectilinear transverse tracks is a frequency modulated carrier whose frequency components correspond to the combined signal applied to the reactance tube 136. This signal is a composite signal having frequency components which correspond to one of the input signals and to the sidebands of sub-carriers which have been amplitude modulated by the remaining signals.

For recording operations, switches S1 and S2 are positioned as illustrated in the solid lines. The rotary head assembly is started in operation by energizing the motor 24, and the tape is driven by starting the motor M. The speed of operation of both of these motors is closely controlled in the manner previously described. The video output is applied to the input amplifiers, for example, amplifiers 101, 106 and 121. These signals are operated upon as previously described and then applied to the separate record amplifiers 226–229 which energize the separate transducer units of the rotary head assembly. The result is that as each head unit sweeps across the tape, it records the frequency modulated carrier in the manner previously described.

After recording operations, the motors are deenergized and the tape is wound back upon the supply reel 12 for a playback operation. The tape may now be applied to another machine with the same electronics as shown is Figure 1B, but having a rotary head which may not be precisely the same as the rotary head used in the recording equipment, due to slight inaccuracy in the manufacturing, or possibly by wear during usage. The head driving the capstan motors of the apparatus is started in operation and by virtue of the manner by which the motors are controlled, the transducer units are caused to accurately track upon the recorded areas. In addition, the speed of movement of each transducer unit with respect to its track is controlled in precisely the same manner as recording. The currents induced in the windings of the several heads are applied to the pre-amplifiers 151–154 and thence to the delay lines 156–159, and then to the mixer amplifiers 161 and 162. The outputs of the mixer amplifiers are alternately passed by the switching devices 163 and 164 and combine for application to the limiter 166. A portion of the signal is sampled and applied to the local oscillator frequency control system. The signal is also demodulated and applied to a low pass filter to derive the Y signal and applied to the single side band detectors 177 and 192 where the sub-carrier is re-injected and the original signal is derived and applied to the amplifiers 187, 201 and thence to the output to derive the I and Q signals.

Figure 6:
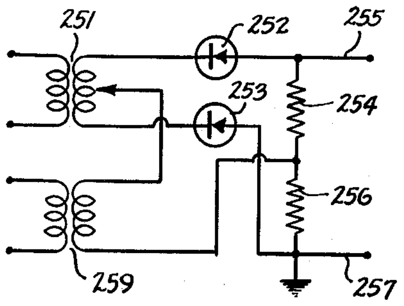
Figure 6 is a circuit diagram of a suitable phase comparator for use in the speed control system.

Various types of phase comparators can be used in connection with the motor control system shown in Figure 1. In Figure 6, I have shown a suitable phase comparator utilizing two diodes. Thus the transformer 251 has its secondary terminals connected to the cathodes of the diodes 252 and 253. The diodes have their anodes connected across load resistors 254 and 256 which in turn connect with the grounded conductor 257 and to the output conductor 255. A second transformer 259 has one terminal of its secondary connected to a center tap on a secondary of the transformer 251. The other secondary terminal of the transformer 259 connects to the common junction of the resistors 254 and 256.

Operation of the phase comparator is as follows: A frequency is applied to the primary of the transformer 259 from one of the amplifiers and clippers. Another signal is applied to the transformer 251. The voltage developed across the secondary of the transformer 251 either adds to or subtracts from the secondary voltage of the transformer 259, depending upon the instantaneous polarity relationship of the two signals. The average current of each of the diodes 252 and 253 depends upon the length of time during each cycle that their applied voltages are in additive or subtractive polarity. This in turn depends upon the phase angle between the two applied waves. When the phase angle is 90° or 270°, the average currents of the diodes are equal, and equal voltages of opposite polarity are developed across the load resistors 254 and 256. Hence the net voltage between the conductor 255 and ground is zero. If the phase angle departs from 90° or 270°, the average diode current will become unbalanced, and the net output voltage between the conductor and ground will no longer be zero. Therefore, the output voltage polarity will depend upon whether the phase angle is leading or lagging the 90° or 270° relation, and the magnitude will be proportional to the amount of lead or lag. Assuming that both applied frequencies have substantially the same wave form, a linear relation between the output voltage and phase angle is obtained over a range of 90°. Since the current flow through the diodes is in the form of pulses, it is desirable to provide a low pass filter in the phase comparator output so that only the direct current voltage proportional to the average current is applied to the associated reactance tube.

Figure 7 illustrates a suitable circuit for the switchers 163 and 164, and also for the phase splitter 204. Cathode followers are incorporated in this circuit for coupling between the phase splitter and the switching tubes. In this instance, tubes T1 and T2 function as switching tubes, tubes T3 and T4 function as cathode followers, and the tube T5 serves as a phase splitter. The input lead 271 is applied to the control grid of tube T5, and this grid also connects to ground through the resistor 272, and to a source of biasing voltage, such as indicated at +250 volts through the resistor 273. The plate of this tube connects to the indicated +250 volts through the resistor 274 and the cathode connects to ground through the cathode resistor 276. The plate of the tube T5 is coupled by condenser 277 with the control grid of the cathode follower tube T3. The control grid of the tube T4 is similarly coupled to the cathode of the tube T5, through condenser 278. The indicated −6 volts bias supply is connected to the control grids of tubes T3 and T4 through the resistors 279, 281. The indicated −150 volt supply connects with the cathodes of the tubes T3, T4 through the cathode resistors 282 and 283.

The plates of both of these tubes connect to the indicated +250 volt supply. The suppressor grids of the tubes T1, T2 are connected to the cathodes of the tubes T3, T4 through the resistors 284 and 286. The screen grid of these tubes T1, T2 are connected together and to ground through the condenser 287. The input leads 288 and 289 (from the mixers and amplifiers 161 and 162) directly connect with the control grids of the tubes T1, T2. These leads also are connected to ground through the series connected resistors 291, 292, 293 and 294. A potentiometer 296 has its one terminal connected to the points 291 and 292 and its other terminal to the point of connection between the resistors 291 and 294. The movab'e contact of this potentiometer is connected by the resistor 297 to the indicated −150 volt supply. By adjusting the potentiometer 296 the bias upon the control of the tubes T1, T2 can adjust for a proper balance of operation. The output lead 298 is coupled to the plates of the tubes T1, T2 through the condenser 299. The plates are directly connected together and also they connect through the resistor 301 and inductance coil 302 to the indicated +250 volt supply. The screen grid of the tubes T1, T2 also connect to the +250 volt supply through the resistor 303.

Clamping means of the diode type are also provided in this circuit for preventing the suppressor grids T1, T2 from going too positive. Thus, diodes 304 and 305 connect between the suppressor grid and ground for the tubes T1, T2, respectively.

The circuit illustrated in Figure 7 functions as follows: Assuming that a substantial square wave is applied to the input lead 271, the phase splitter formed by the tube T5 and its associated circuit components provides split phase voltages on the grids of the cathode follower tubes, T3, T4 which in turn are coupled to the suppressor grids of the tubes T1, T2. Thus, these tubes are alternately driven between voltage values to provide alternate conducting and non-conducting states for the tubes T1, T2. During the period that one of the tubes T1 or T2 is conducting, signals applied to one or the other of the corresponding input leads 288 and 289 are transmitted to the output lead 298.

It is desirable to employ the rotary transducer type of apparatus described for recording and/or reproducing signals which have relatively high frequency components. In some instances it may be practical to employ magnetic tape apparatus of the type in which the magnetic medium is moved past a stationary head. For relatively high frequencies, such apparatus is not considered satisfactory because of the relatively high tape speed required. However, at the lower frequencies where the useable tape speed is reasonable, the modulated carrier may be effectively recorded and/or reproduced by such equipment. Also, for a lower frequency spectrum I may record the composite signal directly without modulating a carrier.

It will be evident that my method and system can be used when it is desirable to record two or more frequency spectrums, each of which may encompass a wide frequency band, and in which the frequencies are substantially higher than those that can be recorded by the use of conventional magnetic tape equipment. The equipment serves to form an interlaced multiplexed composite signal from a plurality of signals. The signals may then be recorded on a single magnetic tape track. Particularly, the invention described is suitable for the recordation and reproduction of color television or like signals.

Reference is also made to copending application in the names of Charles P. Ginsburg, Shelby F. Henderson, Jr., Ray M. Dolby and Charles E. Anderson, entitled "Magnetic Tape System and Method," Serial No. 552,868, filed December 13, 1955, now Patent No. 2,921,990.

I claim:

1. In a method for recording the Y, I and Q color television signals on a single magnetic tape track, wherein relative movement occurs between a transducing means and the magnetic tape, the steps of filtering the Y signal whereby a predetermined band of frequencies is passed, modulating a first subcarrier with the I signal to form sidebands, suppressing said first subcarrier, filtering said signal to pass the lower sideband, the frequency of said first subcarrier being such that the lower sideband interlaces with the Y signal, modulating a second subcarrier with the Q signal to form sidebands, the frequency of said second subcarrier being chosen whereby the sidebands do not interlace with the Y and I signals, suppressing said second subcarrier, combining said I and Q sidebands with said Y signal to form a composite signal, frequency modulating a carrier with said composite signal to form a modulated carrier, referencing said first and second subcarriers and said carrier to a common frequency source, and applying the modulated carrier to the transducing means whereby a single record track is formed which is reproducible to reproduce the color television signals.

2. In a method for reproducing a single track magnetic tape record of a frequency modulated carrier comprising the Y, I and Q color television signals, the frequency modulation of said carrier being in accordance with a composite modulating signal formed by filtering the Y signal whereby a predetermined band of frequencies is passed, modulating a first subcarrier with the I signal to form sidebands, suppressing said first subcarrier, filtering said signal to pass the lower sidebands, the frequency of said first subcarrier being such that the lower sideband interlaces with the Y signal, modulating a second subcarrier with the Q signal to form sidebands, the frequency of said second subcarrier being chosen whereby the sidebands do not interlace with the Y and I signals, suppressing said second subcarrier, and combining said I and Q sidebands with said Y signal to form a composite signal, the steps of scanning said tape with a transducing means whereby a frequency modulated carrier is formed, demodulating said carrier to form a composite signal, filtering said composite signal to pass the Y signal, and demodulating said modulated subcarriers to form the I and Q signals.

3. In a method of recording and reproducing a plurality of signals on a magnetic tape, wherein relative movement occurs between a transducing means and the magnetic tape, the steps of modulating a plurality of subcarriers, combining the modulated subcarriers to form an interlaced composite signal, forming a frequency modulated carrier, the modulation of said carrier being in accordance with the composite signal, referencing the subcarrier frequencies and the carrier frequency to a common frequency, applying the modulated carrier to the transducing means to form a single record track, scanning said record track with transducing means to form a frequency modulated carrier, demodulating said carrier to form a composite signal, demodulating said composite signal to form the plurality of signals.

4. A method as in claim 3, wherein said subcarriers are suppressed during recordation and reinjected during reproduction.

5. In apparatus for recording a first and one or more second signals, means for forming one or more modulated sub-carriers, said sub-carriers being modulated by said second signals, means for combining said modulated sub-carriers with said first signal to form a composite signal, means for forming a frequency modulated carrier, the carrier being modulated by the composite signal, a reference frequency source, means for referencing the sub-carrier frequency and the carrier frequency to the reference frequency source, transducing means energized by said frequency modulated carrier, and means for transporting a magnetic tape in operative relationship with the transducing means whereby the frequency modulated carrier is recorded thereon.

6. In apparatus for reproducing a single track magnetic tape record of a first and one or more second signals comprising a frequency modulated carrier, the carrier being frequency modulated by a composite modulated signal formed by modulating one or more sub-carriers and combining the modulated sub-carriers with said first signal, and referencing the sub-carrier frequency and the carrier frequency to a common frequency, transducing means serving to reproduce the frequency modulated carrier, means for transporting a tape in operative relationship with the transducing means, means for demodulating said frequency modulated carrier, means for extracting the first signal from said demodulated carrier, and means for demodulating the demodulated sub-carriers to form the one or more second signals.

7. In apparatus for recording a first and one or more second signals, means for forming one or more modulated sub-carriers, the modulation of said sub-carriers being in accordance with said second signals, means for suppressing the sub-carriers, means for combining said modulated sub-carriers with said first signal to form a composite signal, means for forming a frequency modulated carrier, the carrier being modulated by the composite signal, a reference frequency source, means for referencing the sub-carrier frequency and the carrier frequency to the reference frequency source, transducing means energized by said frequency modulated carrier, and means for transporting a magnetic tape in operative relationship with the transducing means whereby the frequency modulated carrier is recorded thereon.

8. In a method for recording a plurality of signals on a magnetic tape, wherein relative movement occurs between a transducing means and the magnetic tape, the steps of forming an interlaced multiplexed composite signal by modulating a plurality of subcarriers and combining the modulated subcarriers, forming a modulated carrier, said carrier being modulated by the frequency components of said composite signal, referencing the subcarriers and the carrier to a common frequency, and applying the modulated carrier to a transducing means whereby a single record track is formed which is reproducible to reproduce the original signals.

9. In a method for recording a first and one or more second signals on a magnetic tape, wherein relative movement occurs between a transducing means and the magnetic tape, the steps of modulating one or more subcarriers with said second signals, combining said first signal with said modulated subcarriers to form an interlaced composite signal, modulating a carrier with said composite signal to form a frequency modulated carrier, referencing the subcarrier and carrier frequencies to a common frequency, and applying said frequency modulated carrier to the transducing means whereby a single record track is formed which is reproducible to reproduce the original signals.

10. In a method for recording first, second and third signals on a magnetic track, wherein relative movement occurs between a transducing means and the magnetic tape, the steps of modulating a first subcarrier with said second signal to form a first modulated subcarrier, modulating a second subcarrier with said third signal to form a second modulated subcarrier, the frequency of said subcarriers being chosen whereby the sidebands interlace with one another and with the first signal, combining said first signal and said first and second modulated subcarriers to form an interlaced composite signal, frequency modulating a carrier with said composite signal to form a modulated carrier, referencing said subcarrier frequency and said carrier frequency to a common frequency, suppressing said subcarriers, and applying said modulated carrier to a transducing means whereby a single record track is formed which is reproducible to reproduce the original signals.

11. In a method for recording and reproducing the Y, I and Q color television signals on a single magnetic track, wherein relative movement occurs between a transducing means and the magnetic tape, the steps of filtering the Y signal whereby a predetermined band of frequencies is passed, modulating a first subcarrier with the I signal to form sidebands, suppressing said first subcarrier, filtering said signal to pass the lower sidebands, the frequency of said first subcarrier being such that the lower sidebands interlace with the Y signal, modulating a second subcarrier with the Q signal to form sidebands, the frequency of said second subcarrier being chosen whereby the sidebands do not interlace with the Y and I signals, suppressing said second subcarrier, combining said I and Q sidebands with said Y signal to form a composite signal, frequency modulating a carrier with said composite signal to form a modulated carrier, referencing said first and second subcarriers and said carrier to a common frequency, applying the modulated carrier to the transducing means whereby a single record track is formed which is reproducible to reproduce the frequency modulated carrier, reproducing said record track to form a modulated carrier, demodulating said carrier to form a composite signal, filtering said composite signal to pass the Y signal, and demodulating said modulated subcarrier to form the I and Q signals.

References Cited in the file of this patent

UNITED STATES PATENTS

| | | |
|---|---|---|
| 2,583,983 | Arndt | Jan. 29, 1952 |
| 2,668,283 | Mullin | Feb. 2, 1954 |
| 2,677,049 | Rogers | Apr. 27, 1954 |
| 2,736,762 | Kell | Feb. 28, 1956 |
| 2,773,120 | Masterson | Dec. 4, 1956 |

OTHER REFERENCES

"Practical Color Television for the Service Industry," by RCA Service Co. Inc., Camden, N.J. (Copy in Div. 41.)